US012794353B2

(12) United States Patent
Chen et al.

(10) Patent No.: US 12,794,353 B2
(45) Date of Patent: Nov. 10, 2026

(54) CONVERTER AND CHOPPER TRANSISTOR BLOCKING CONTROL METHOD THEREFOR

(71) Applicant: Sungrow Power Supply Co., Ltd., Hefei (CN)

(72) Inventors: Qiaodi Chen, Hefei (CN); Yu Gu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 98 days.

(21) Appl. No.: 18/867,795

(22) PCT Filed: Dec. 30, 2022

(86) PCT No.: PCT/CN2022/144053
§ 371 (c)(1),
(2) Date: Nov. 20, 2024

(87) PCT Pub. No.: WO2024/011875
PCT Pub. Date: Jan. 18, 2024

(65) Prior Publication Data
US 2025/0317049 A1 Oct. 9, 2025

(30) Foreign Application Priority Data
Jul. 14, 2022 (CN) ......................... 202210825030.0

(51) Int. Cl.
*H02M 1/32* (2007.01)
*H02M 7/48* (2007.01)

(52) U.S. Cl.
CPC ........... *H02M 1/32* (2013.01); *H02M 7/4807* (2013.01)

(58) Field of Classification Search
CPC .... H02M 5/225; H02M 5/2932; H02M 5/297; H02M 7/4807; H02M 1/32; H02M 1/36; H02H 7/122–7/127
See application file for complete search history.

(56) References Cited

U.S. PATENT DOCUMENTS

2015/0168461 A1 6/2015 Sardat et al.
2016/0141972 A1* 5/2016 Yamada
(Continued)

FOREIGN PATENT DOCUMENTS

CN 101386099 A 3/2009
CN 102136810 A 7/2011
(Continued)

OTHER PUBLICATIONS

First Office Action for Chinese Application No. 202210825030.0, dated Aug. 23, 2022.
(Continued)

*Primary Examiner* — Crystal L Hammond
*Assistant Examiner* — Seung Ho Choi
(74) *Attorney, Agent, or Firm* — Wolf, Greenfield & Sacks, P.C.

(57) ABSTRACT

The present application provides a converter and a chopper transistor blocking control method therefor. According to the chopper transistor blocking control method, when switching transistors in a converter need to be blocked, switching transistors in a primary side circuit connected to a transformer of the converter are blocked, and switching transistors in a secondary side circuit are blocked when the current on a branch where a secondary side winding in the transformer is located is zero, or batch blocking of the switching transistors in the secondary side circuit is completed after the current on the branch where the secondary side winding is located recirculates to zero, thereby avoiding overvoltage
(Continued)

damage to the switching transistors caused by the current on the branch where the secondary side winding is located recirculating by means of the junction capacitance of the switching transistors in the secondary side circuit.

14 Claims, 10 Drawing Sheets

(56) References Cited

U.S. PATENT DOCUMENTS

| | | | |
|---|---|---|---|
| 2021/0135581 | A1 | 5/2021 | Rajashekara et al. |
| 2022/0263428 | A1* | 8/2022 | Kim |
| 2022/0274641 | A1 | 9/2022 | Obara et al. |
| 2022/0416679 | A1 | 12/2022 | Wang et al. |

FOREIGN PATENT DOCUMENTS

| | | | |
|---|---|---|---|
| CN | 105552851 | A | 5/2016 |
| CN | 112564485 | A | 3/2021 |
| CN | 112600454 | A | 4/2021 |
| CN | 113381616 | A | 9/2021 |
| CN | 113726143 | A | 11/2021 |
| CN | 113949259 | A | 1/2022 |
| CN | 114900027 | A | 8/2022 |
| DE | 11 2020 003 704 | T5 | 5/2022 |
| EP | 2 884 288 | A1 | 6/2015 |
| EP | 2 991 209 | B1 | 9/2018 |
| IT | 201900007386 | A1 | 11/2020 |
| JP | 2015-198461 | A | 11/2015 |
| WO | WO 2020/240406 | A1 | 12/2020 |

OTHER PUBLICATIONS

International Search Report and Written Opinion for International Application No. PCT/CN2022/144053, mailed Mar. 17, 2023.

Extended European Search Report for European Application No. 22950981.5, dated Jun. 9, 2026.

Song et al., DC Short Circuit Fault Soft Shutdown Strategy for Reduced Matrix Converte. IEEE 9th International Power Electronics and Motion Control Conference (IPEMC), Nov. 2, 20209:2675-80.

* cited by examiner

CONVERTER AND CHOPPER TRANSISTOR BLOCKING CONTROL METHOD THEREFOR

This application is a national stage filing under 35 U.S.C. § 371 of International Patent Application Serial No. PCT/CN2022/144053, filed Dec. 30, 2022, which claims priority to Chinese Patent Application No. 202210825030.0 titled "CONVERTER AND CHOPPER TRANSISTOR BLOCKING CONTROL METHOD THEREFOR", filed on Jul. 14, 2022 with the China National Intellectual Property Administration (CNIPA). The contents of these applications are incorporated herein by reference in their entirety.

FIELD

The present disclosure relates to the technical field of power electronics, and in particular to a converter and a pulse blocking method for controlling the converter.

BACKGROUND

A converter is connected to a power grid through a bidirectional switching circuit on a secondary side of the converter, and a bridge arm in the bidirectional switching circuit includes half bridge arms formed by two bidirectional switches. Each of the bidirectional switches is formed by two switching transistors connected in reverse series. As shown in FIG. 1, switching transistors S5 and S6 form a bidirectional switch at an upper half bridge arm, and switching transistors S7 and S8 form a bidirectional switch at a lower half bridge arm.

In a case where an alternating-current side of the converter is connected to the power grid, various switching transistors on the secondary side operate in a first mode if a grid voltage is greater than zero, and operate in a second mode if the grid voltage is less than zero. As shown in FIG. 2, in the first mode, S5 and S7 complementarily operate as chopper transistors to perform high-frequency chopping, and S6 and S8 are directly turned on; and in the second mode, S6 and S8 complementarily operate as chopper transistors to perform high-frequency chopping, and S5 and S7 are directly turned on.

During performing a pulse blocking protection by directly turning off all switching transistors in response to a shutdown command or triggering fault protection, inductor current has no freewheeling loop and only continues to flow through a parasitic capacitor of the switching transistor due to the bidirectional switch on the bridge arm of the secondary side. If the inductor current $i_L$ is large (such as a point A shown in FIG. 3), a significant voltage surge occurs on the parasitic capacitor of the switching transistor, which may easily cause damage to the switching transistor due to overvoltage.

SUMMARY

A converter and a pulse blocking method for controlling the converter are provided according to the present disclosure, to avoid damage to the switching transistor due to overvoltage.

The following technical solutions are provided according to the present disclosure for achieving the above objective.

In a first aspect of the present disclosure, a pulse blocking method for controlling a converter is provided. A half bridge arm of a secondary circuit connected to a transformer in the converter includes a bidirectional switch, and the transformer is connected in series with an inductive device. The pulse blocking method includes: determining whether to turn off switching transistors in the converter; turning off switching transistors in a primary circuit connected to the transformer, if it is determined to turn off the switching transistors in the converter; and turning off switching transistors in the secondary circuit in a case that current flowing through a branch where a secondary winding of the transformer is located is zero; or, turning off switching transistors in the secondary circuit in batches in a case that current flowing through a branch where a secondary winding of the transformer is located continues to flow and is decreased to zero.

In a second aspect of the present disclosure, a converter is provided. The converter includes a transformer, an inductive device, a primary circuit, a secondary circuit and a controller. A first side of the primary circuit serves as a first side of the converter, and a second side of the primary circuit is connected to a first side of the secondary circuit through the inductive device and the transformer connected in series. A second side of the secondary circuit serves as a second side of the converter, and a half bridge arm of the secondary circuit includes a bidirectional switch. The primary circuit and the secondary circuit are controlled by the controller, and the controller is configured to perform the pulse blocking method for controlling a converter according to any of the first aspect.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions according to the embodiments of the present disclosure are described clearly and completely hereinafter in conjunction with the drawings in the embodiments of the present disclosure. It is apparent that the described embodiments are only some of the embodiments according to the present disclosure, rather than all the embodiments. Any other embodiments obtained by those skilled in the art based on the embodiments of the present disclosure without any creative work fall within the protection scope of the present disclosure.

In the present disclosure, terms of "include", "comprise" or any other variants are intended to be non-exclusive. Therefore, a process, method, article or device including a series of elements includes not only the elements but also other elements that are not enumerated, or further includes the elements inherent for the process, method, article or device. Unless expressively limited otherwise, the statement "comprising (including) one . . . " does not exclude existence of other similar elements in the process, method, article or device.

Figure 1:
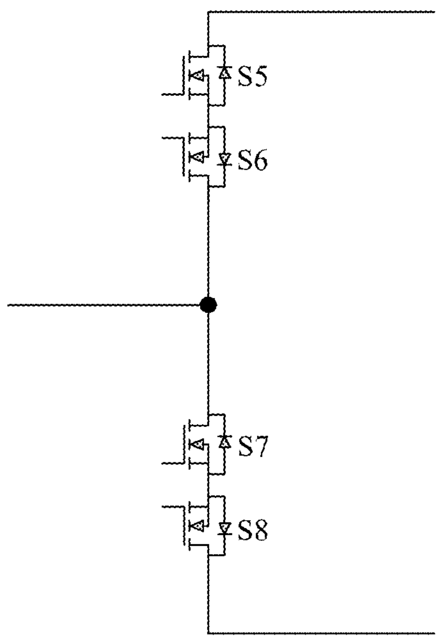
FIG. 1 is a schematic structural diagram of a bridge arm of a bidirectional switching circuit on a secondary side in a converter according to the conventional technology.
Figure 2:
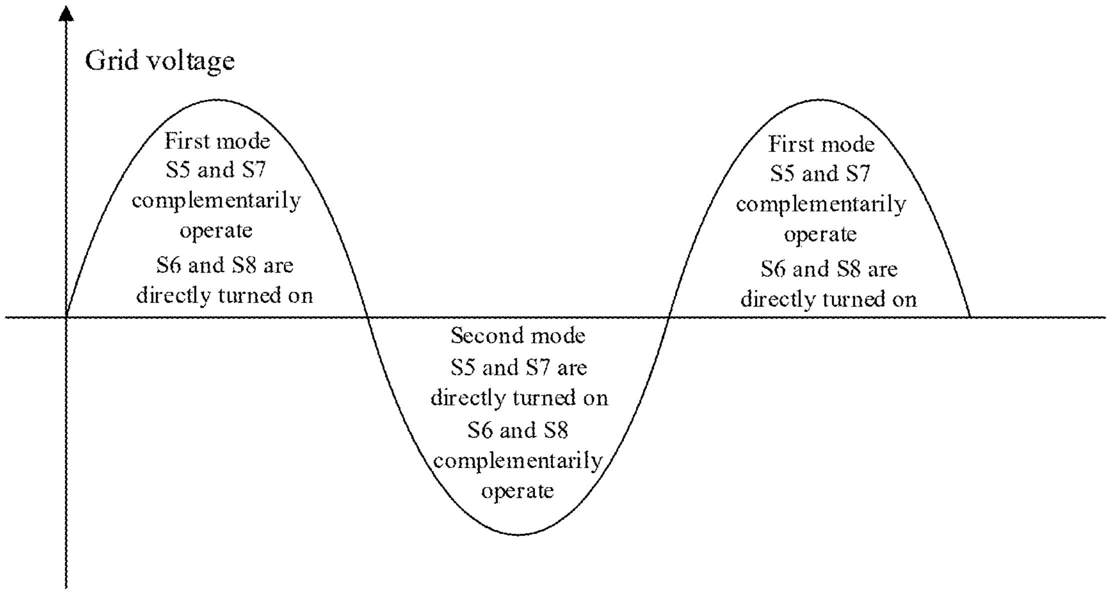
FIG. 2 is a schematic diagram illustrating an operating mode of each switching transistor on a secondary side in a converter according to the conventional technology.
Figure 4A:
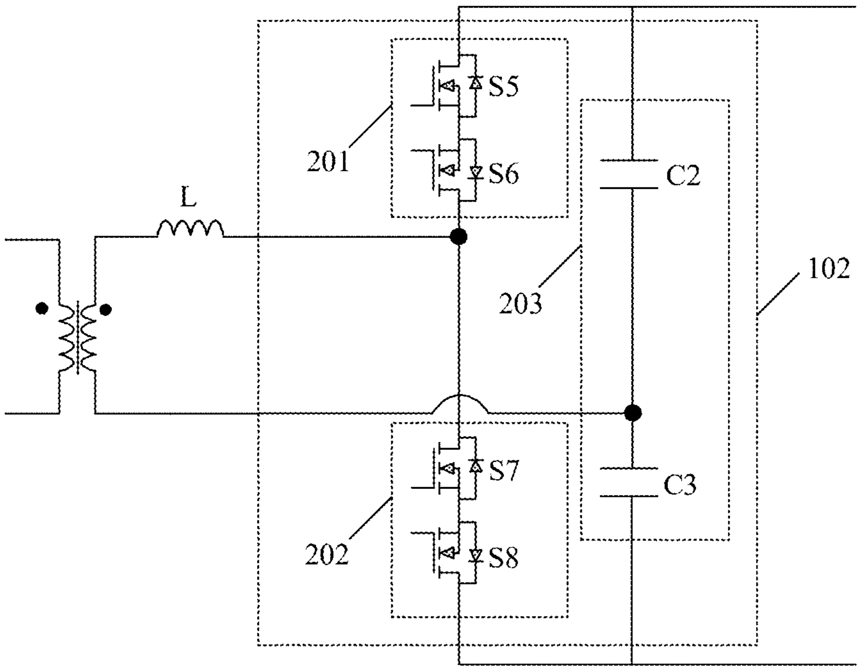
FIG. 4*a* is a structural diagram of a secondary circuit in a converter according to an embodiment of the present disclosure.
Figure 4B:
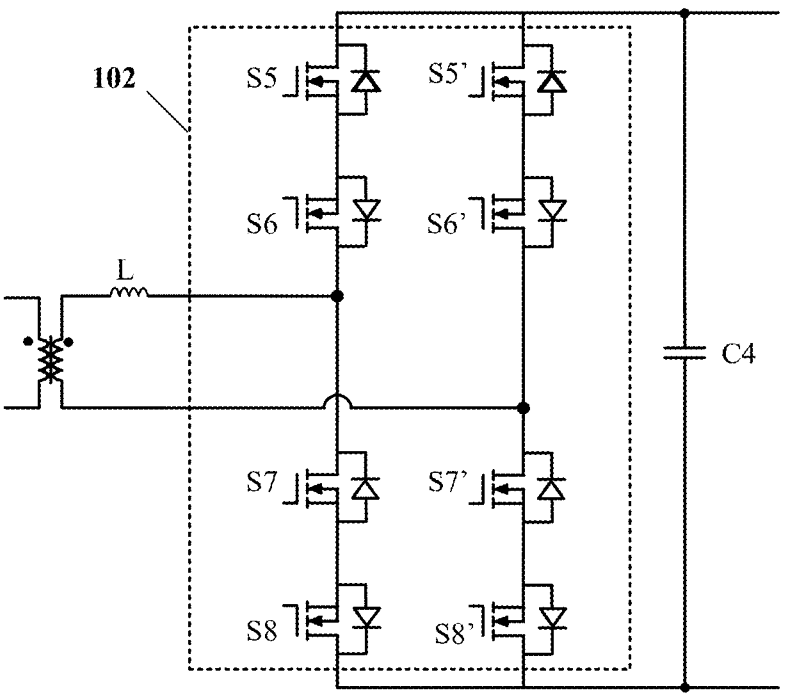
FIG. 4*b* is a structural diagram of a secondary circuit in a converter according to another embodiment of the present disclosure.
Figure 4C:
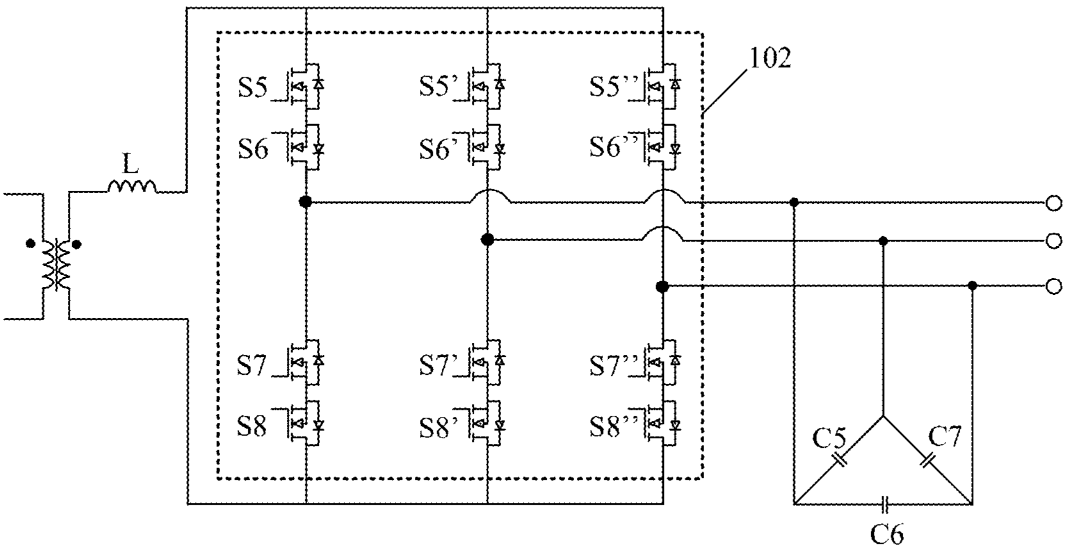
FIG. 4*c* is a structural diagram of a secondary circuit in a converter according to another embodiment of the present disclosure.

In a converter, a secondary circuit is implemented by a bridge arm in a structure as shown in FIG. 1. The secondary circuit may be of a single-phase structure indicated by 102 as shown in FIG. 4*a* or FIG. 4*b*, or may be of a three-phase structure indicated by 102 as shown in FIG. 4*c*. Regardless of the single-phase structure or the three-phase structure, each half bridge arm is implemented by a bidirectional switch. As a result, a pulse blocking protection is performed by directly turning off all switching transistors, resulting in a significant voltage surge on a parasitic capacitor of a switching transistor.

Therefore, a pulse blocking method for controlling a converter is provided according to the present disclosure, to avoid damage to a switching transistor due to overvoltage.

Figure 5:
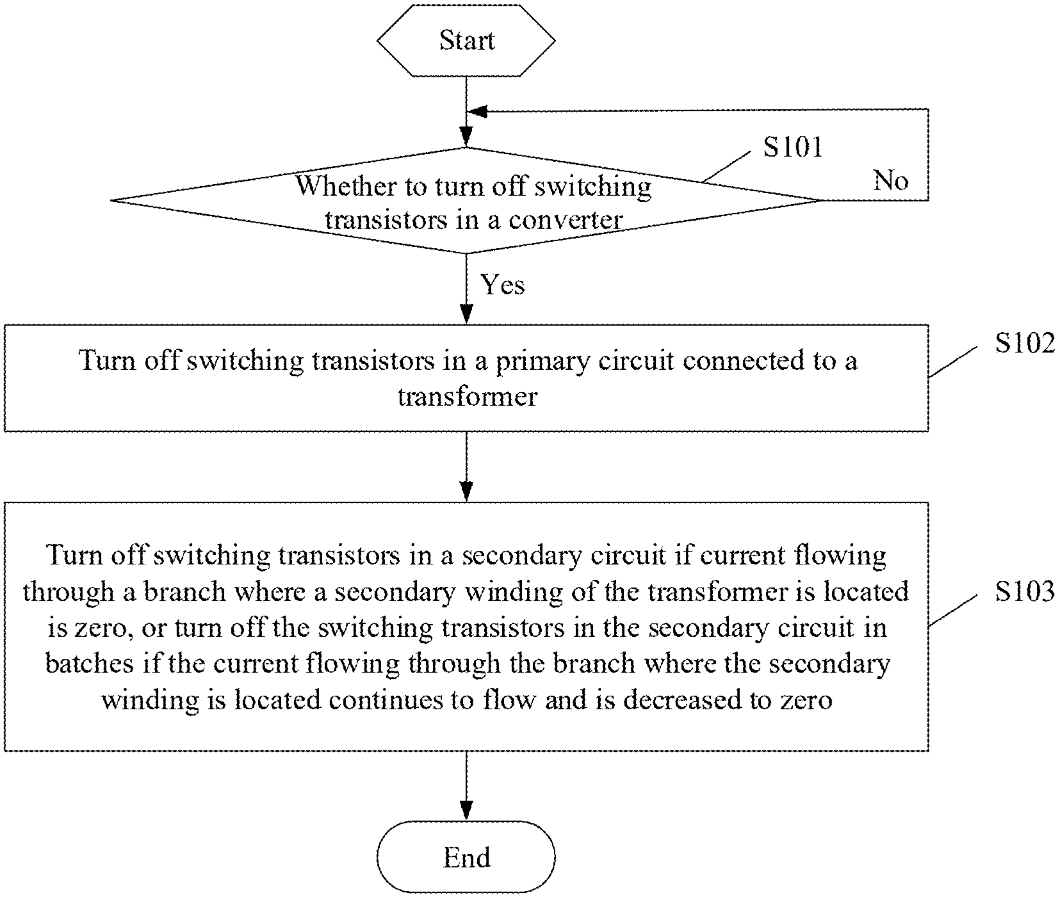
FIG. 5 is a flow chart of a pulse blocking method for controlling a converter according to an embodiment of the present disclosure.

Referring to FIG. 5, the pulse blocking method for controlling a converter includes the following steps S101 to S103.

In step S101, it is determined whether to turn off switching transistors in the converter.

The process may include determining whether a shutdown command or a pulse blocking command is received. On receipt of the shutdown command or the pulse blocking command, it is determined to turn off the switching transistors in the converter, and the process proceeds to steps S102 and S103.

It should be noted that an order of steps S102 and S103 in FIG. 5 is only an example, which is not limited herein. In practice, the two steps may be performed in a different order from the illustrated order or performed simultaneously, depending on the application environment. All the implementations fall within the protection scope of the present disclosure.

In step S102, switching transistors in a primary circuit connected to a transformer are turned off.

The switching transistors in the primary circuit may be directly turned off, so that the converter is disconnected from other circuits or a power supply connected to the primary side, thereby preventing the converter from continuing to transmit power to other device on the primary side.

In step S103, switching transistors in the secondary circuit are turned off in a case that current flowing through a branch where a secondary winding of the transformer is located is zero. Alternatively, the switching transistors in the secondary circuit are turned off in batches in a case that the current flowing through the branch where the secondary winding is located continues to flow and is decreased to zero.

Figure 3:
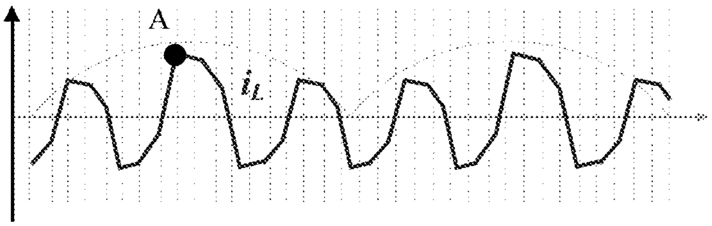
FIG. 3 is a waveform diagram of an inductor current in a converter according to the conventional technology.
Figure 6:
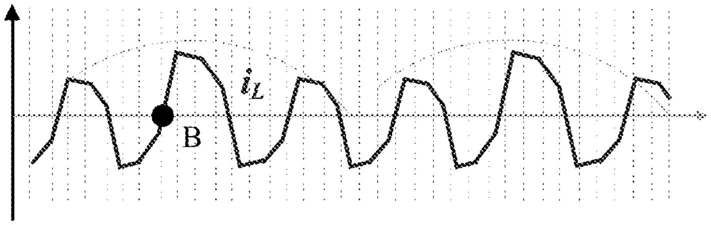
FIG. 6 is a waveform diagram of current flowing through a branch where a secondary winding is located in a converter according to an embodiment of the present disclosure.

On receipt of the shutdown command or the pulse blocking command, current flowing through the branch where the secondary winding is located may be located at any position on a curve of an $i_L$ in FIG. 3, with a high probability of locating at a non-zero point. That is, current flows through the branch where the secondary winding is located. In this case, if the switching transistors in the secondary circuit are directly turned off, the current flowing through the branch where the secondary winding is located continues to flow through a parasitic capacitor of the switching transistor in the secondary circuit, which may easily cause damage to the switching transistor due to overvoltage. Therefore, in step S103, instead of directly turning off the switching transistors in the secondary circuit, the switching transistors in the secondary circuit are turned off in batches. For example, a current operating mode of the secondary circuit is maintained until the current flowing through the branch where the secondary winding is located reaches at a zero-crossing point (such as a point B as shown in FIG. 6). Alternatively, a part of the switching transistors in the secondary circuit are turned off first, the current flowing through the branch where the secondary winding is located continues to flow through a freewheeling loop formed by the other part of the switching transistors, and the other part of the switching transistors are turned off if the current is decreased to zero.

With the pulse blocking method for controlling a converter according to the embodiment, all the switching transistors in the secondary circuit are turned off through the process described above during turning off the switching transistors in the converter, preventing current flowing through the branch where the secondary winding is located from continuing to flow through a junction capacitor of the switching transistor in the secondary circuit, thereby avoiding damage to the switching transistor due to overvoltage.

Figure 7:
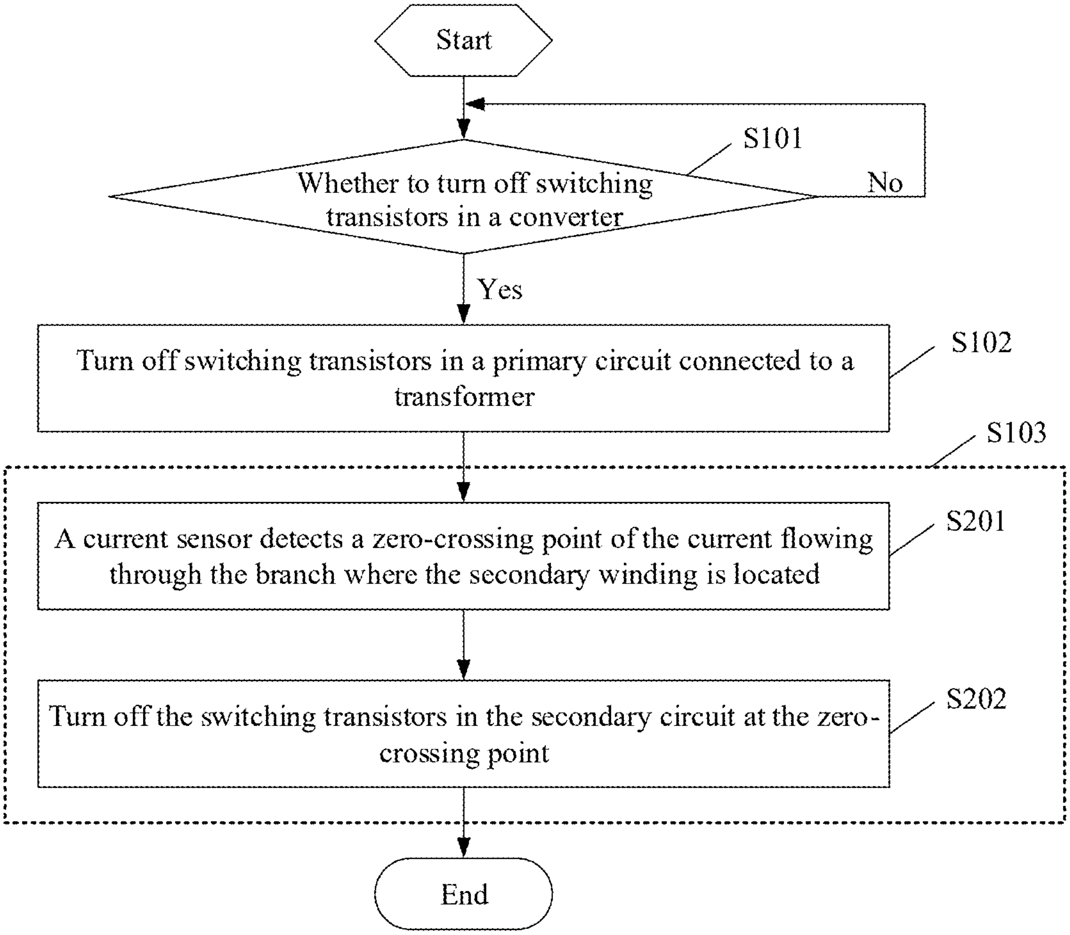
FIG. 7 is a flow chart of a pulse blocking method for controlling a converter according to another embodiment of the present disclosure.

Based on the previous embodiment, in an embodiment, as shown in FIG. 7, the step S103 of the pulse blocking method for controlling a converter includes the following steps S201 and S202.

In step S201, a zero-crossing point of the current flowing through the branch where the secondary winding is located is detected by a current sensor.

The secondary circuit of the converter is provided with a current sensor, such as a CT (current transformer) or a Hall sensor chip, thus obtaining a waveform of the current $i_L$ flowing through the branch where the secondary winding is located.

In step S202, the switching transistors in the secondary circuit are turned off at the zero-crossing point.

All switching transistors are turned off in a case of large current flowing through the branch where the secondary winding is located, the current flowing through the branch where the secondary winding is located continues to flow through the junction capacitor of the switching transistor, resulting in the damage to the switching transistor due to overvoltage. In order to avoid the above problems, in response to a shutdown command or triggering fault protection, the switching transistors in the primary circuit of the transformer are turned off first. The zero-crossing point (such as, the point B as shown in FIG. 6) of the current flowing through the branch where the secondary winding is located is detected by the current sensor, such as the CT or the Hall sensor chip, connected in series with the secondary winding, and the switching transistors in the secondary circuit are turned off at the zero-crossing point, thereby avoiding the switching transistors from being turned off at the non-zero point of the current, protecting the switching transistors in the secondary circuit.

According to the solution, the zero-crossing point of the current flowing through the branch where the secondary winding is located is detected, and the switching transistors in the secondary circuit are turned off at the zero-crossing point of the current flowing through the branch where the secondary winding is located, preventing the current flowing through the branch where the secondary winding is located from continuing to flow through a junction capacitor of the switching transistor in the secondary circuit, thereby avoiding the damage to the switching transistor due to overvoltage.

In practices, after the step S101, the step S103 in the solution may be performed before the step S102. Alternatively, S103 and S102 may be performed simultaneously, depending on the application environment. All the implementations fall within the protection scope of the present disclosure.

Figure 8:
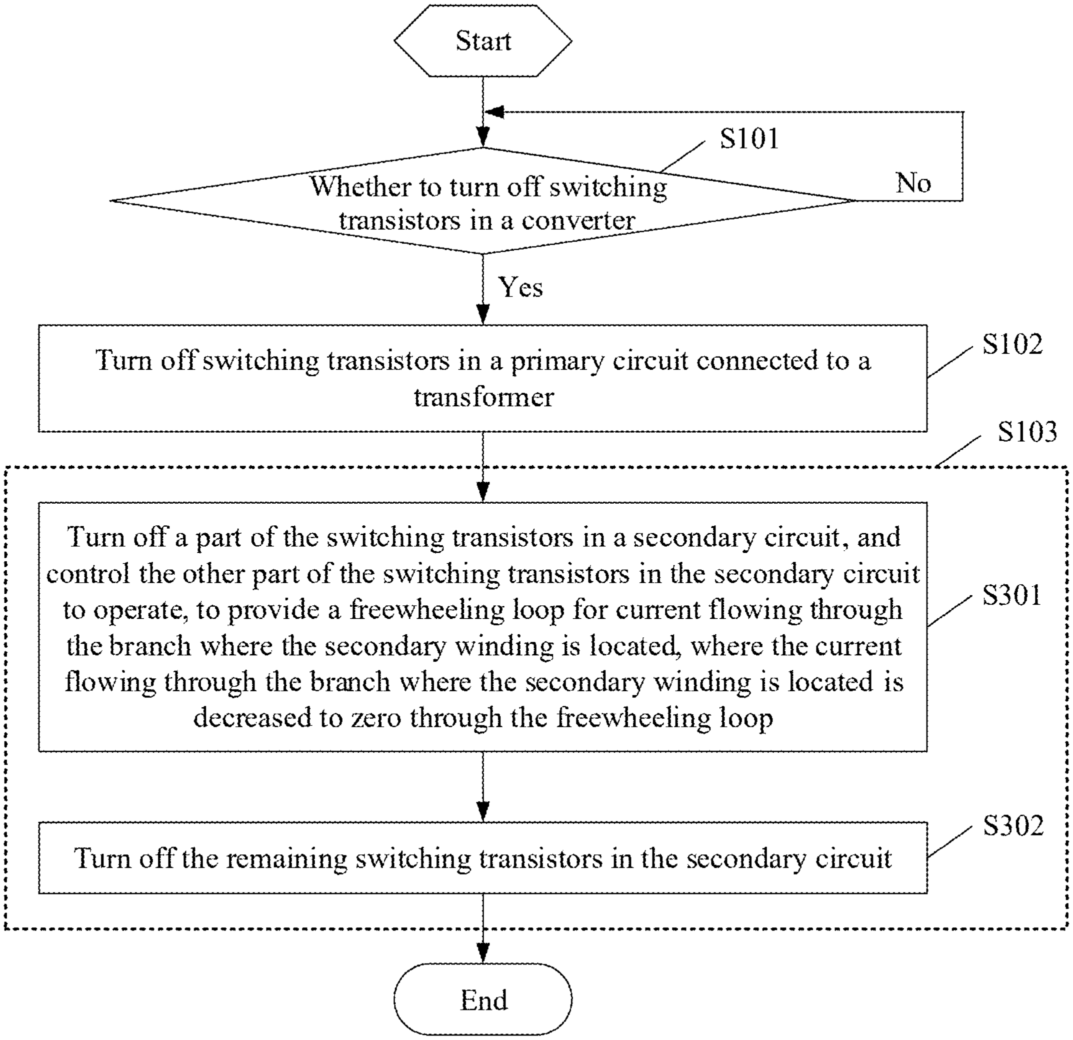
FIG. 8 is a flow chart of a pulse blocking method for controlling a converter according to another embodiment of the present disclosure.

In practices, on a premise that no current sensor is connected in series with the secondary winding, the step S102 may be performed before the step S103, in order to save the cost. In this case, as shown in FIG. 8, the step S103 includes the following steps S301 and S302.

In step S301, a part of the switching transistors in the secondary circuit are turned off, and the other part of the switching transistors in the secondary circuit are controlled to operate, to provide the freewheeling loop for the current flowing through the branch where the secondary winding is located, and the current flowing through the branch where the secondary winding is located is decreased to zero through the freewheeling loop.

The freewheeling loop may be formed by additional devices, in order to decrease the current flowing through the branch where the secondary winding is located to zero. Preferably, a capacitor connected to the converter receives the current flowing through the branch where the secondary winding is located by means of the existing switching transistors in the secondary circuit, achieving the freewheeling and saving the structural cost of the freewheeling. In this way, the current sensor in the previous solution is not arranged, further reducing the cost.

In step S302, the remaining switching transistors in the secondary circuit are turned off.

According to the solution in the present disclosure, during stopping a system or triggering protection, a part of the switching transistors in the secondary circuit are controlled to operate, rather than directly turning off all the switching transistors, providing a freewheeling loop for the current flowing through the branch where the secondary winding is located. The remaining switching transistors are turned off if the freewheeling current is zero, thus achieving the pulse blocking control, avoiding the damaged to the switching transistors in the secondary circuit due to overvoltage.

For the solution shown in FIG. 8, two implementations of blocking timing of the switching transistors in the secondary circuit are provided according to the present disclosure.

In an embodiment, chopper transistors are turned off first, and turn-on transistors are directly turned on. The turn-on transistor provides a freewheeling loop for the current flowing through the branch where the secondary winding is located. The turn-on transistors are turned off when a preset time period expires.

In this case, before the step S301, the chopper transistor and the turn-on transistor are determined based on a current condition of an instantaneous value of a grid voltage or a phase angle of the grid voltage. Under the current condition of the instantaneous value of the grid voltage or the phase angle of the grid voltage, the chopper transistor is a switching transistor that performs a chopping operation in each bidirectional switch in a PWM control manner. The chopping operation is a high-frequency chopping operation. Under the current condition of the instantaneous value of the grid voltage or the phase angle of the grid voltage, the turn-on transistor is a switching transistor that is directly turned on in the bidirectional switch.

If the instantaneous value of the grid voltage is greater than zero, in the upper half bridge arm, a switching transistor, for which a conduction direction of a diode is directed to the power grid is a chopper transistor, and the other switching transistor is the turn-on transistor; and in the lower half bridge arm, a switching transistor, for which a conduction direction of a diode is directed to the power grid is the turn-on transistor and the other switching transistor is the chopper transistor. If the instantaneous value of the grid voltage is less than zero, situations of the chopper transistor and the turn-on transistor are opposite to the above, and are adjusted accordingly, which are not described in detail herein.

For example, in the secondary circuit 102 shown in FIG. 4*a*, if the instantaneous value of the grid voltage is greater than zero, the switching transistors S5 and S7 are chopper transistors, and the switching transistors S6 and S8 are turn-on transistors; and if the instantaneous value of the grid voltage is less than zero, the switching transistors S5 and S7 are turn-on transistors, and the switching transistors S6 and S8 are chopper transistors.

In addition, the phase angle of the grid voltage ranges from 0 to $\pi$ in a case that the instantaneous value of the grid voltage is greater than zero. The phase angle of the grid voltage ranges from $\pi$ to $2\pi$ in a case that the instantaneous value of the grid voltage is less than zero, which is not described in detail herein. $\pi$ represents the circular constant.

In this embodiment, during stopping the system or performing the pulse blocking control in response to triggering protection, the switching transistors in the primary circuit are first turned off, disconnecting the primary circuit from other device on the primary side. Then, an operating mode is determined based on the instantaneous value of the grid voltage or the phase angle of the grid voltage, the chopper transistor in the secondary circuit is turned off first, allowing the current flowing through the branch where the secondary winding is located continues to flow through the freewheeling loop formed by the turn-on transistor and a diode of the switching transistor being turned off. The turn-on transistor is turned off when the preset time period expires, such as at least one switching cycle, that is, on the condition that the current flowing through the branch where the secondary winding is located is decreased to zero.

Figure 9A:
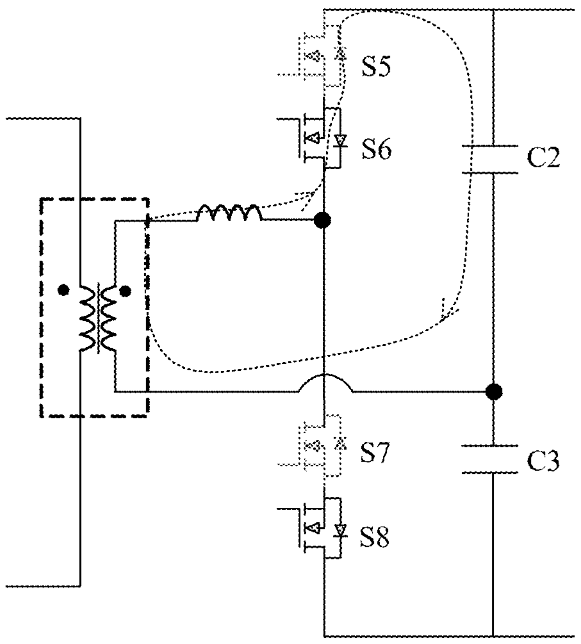
FIG. 9*a* is a schematic diagram of a freewheeling loop of current flowing through a branch where a secondary winding is located in a converter according to an embodiment of the present disclosure.
Figure 9B:
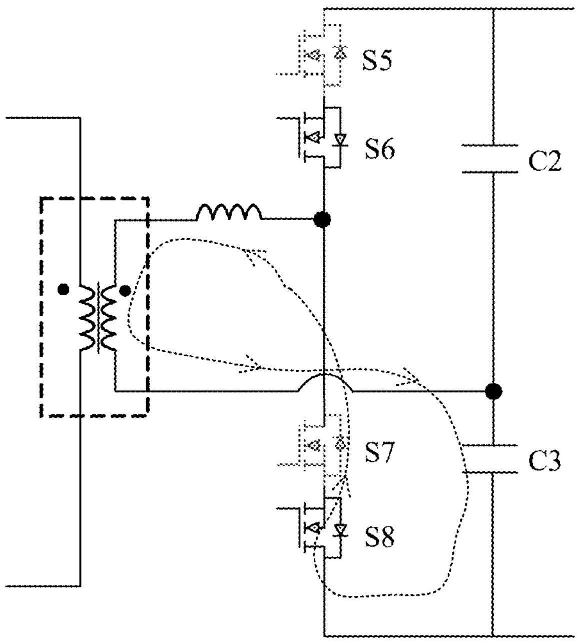
FIG. 9*b* is a schematic diagram of a freewheeling loop of current flowing through a branch where a secondary winding is located in a converter according to another embodiment of the present disclosure.

The following description is provided by an example where the structure shown in FIG. 4*a* is under a condition that the instantaneous value of the grid voltage is greater than zero, that is, the grid voltage is in a positive half cycle. During stopping the system or performing the pulse blocking control in response to triggering protection, the switching transistors S5 and S7 in FIG. 4*a* are turned off, the switching transistors S6 and S8 continues to be on, providing the freewheeling loop for the current flowing through the branch where the secondary winding is located. FIG. 9*a* illustrates a situation where positive current flows through the branch where the secondary winding is located. The current flowing through the branch where the secondary winding is located flows through a freewheeling loop formed by the switching transistor S6, a body diode or anti-parallel diode of the switching transistor S5 and a capacitor C2 on the other side of the converter. The body diode or anti-parallel diode of the switching transistor S5 withstands a reverse voltage and is turned off if the current flowing through the branch where the secondary winding is located is decreased to zero, and the current flowing through the branch where the secondary winding is located is not increased in a reverse direction, thus achieving the freewheeling. FIG. 9*b* illustrates a situation where negative current flows through the branch where the secondary winding is located. The current flowing through the branch where the secondary winding is located flows through a capacitor C3 on the side of the converter, the switching transistor S8, and a body diode or anti-parallel diode of the switching transistor S7. The body diode or anti-parallel diode of the switching transistor S7 withstands a reverse voltage and is turned off if the current flowing through the branch where the secondary winding is located is increased from the negative current to zero, and the current flowing through the branch where the secondary winding is located no longer is not increased, thus completing the freewheeling.

In another embodiment, in the secondary circuit, the switching transistor in each half bridge arm that forms a loop with the secondary winding and any one capacitor on the other side of the secondary circuit is directly turned on, and the other switching transistors are turned off, and the remaining switching transistors are turned off if the preset time period expires.

For the structure shown in FIG. 4*a*, any one half bridge arm in the secondary circuit is directly turned on. For example, the upper half bridge arm is directly turned on, and the lower half bridge arm is turned off. Alternatively, the lower half bridge arm is directly turned on, and the upper half bridge arm is turned off, thus providing the freewheeling loop for the current flowing through the branch where the secondary winding is located, allowing the current to flow to a corresponding capacitor in an alternating-current capacitor bridge arm connected to the secondary side of the converter.

Figure 10A:
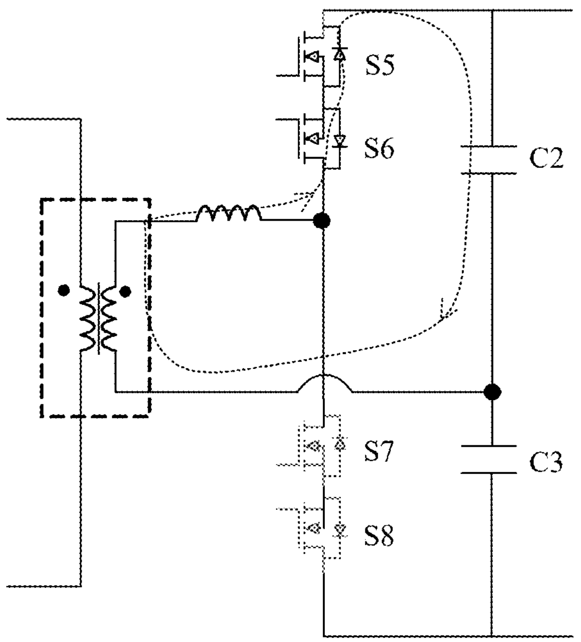
FIG. 10*a* is a schematic diagram of a freewheeling loop of current flowing through a branch where a secondary winding is located in a converter according to another embodiment of the present disclosure.
Figure 10B:
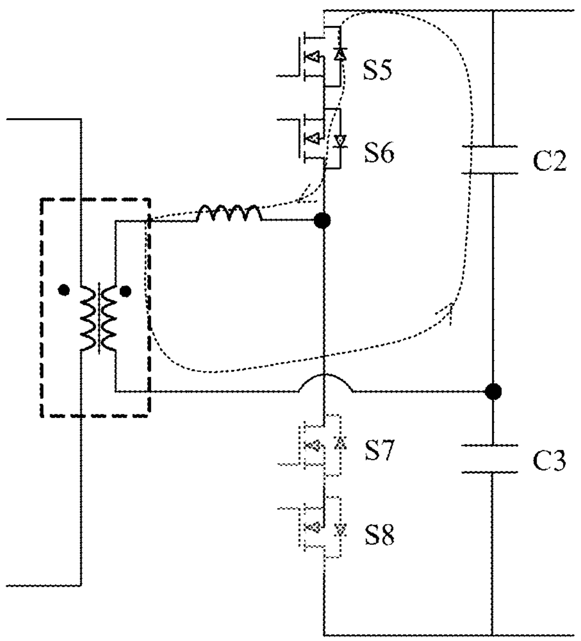
FIG. 10*b* is a schematic diagram of a freewheeling loop of current flowing through a branch where a secondary winding is located in a converter according to another embodiment of the present disclosure.

The following description is provided by an example where the instantaneous value of the grid voltage is greater than zero, that is, the grid voltage is in the positive half cycle. During stopping the system or performing the pulse blocking control in response to triggering protection, the switching transistors S5 and S6 are directly turned on, and the switching transistors S7 and S8 are turned off. The current flowing through the branch where the secondary winding is located continues to flow through the switching transistors S5 and S6 that are directly turned on and the capacitor C2. The current flowing through the branch where the secondary winding is located is decreased to zero if a time period expires (that is, the preset time period), and then the switching transistor S5 and S6 are turned off, protecting the switching transistors from being damaged due to overvoltage. As shown in FIG. 10*a*, a dashed line with an arrow indicates the freewheeling loop if the positive current flows through the branch where the secondary winding is located. As shown in FIG. 10*b*, a dashed line with an arrow indicates the freewheeling loop if the negative current flows through the branch where the secondary winding is located.

Similarly, in another embodiment, the switching transistors S7 and S8 are directly turned on and the switching transistors S5 and S6 are turned off, providing the freewheeling loop for the current flowing through the branch where the secondary winding is located, which is not described in detail herein.

For the structures shown in FIG. 4*b* and FIG. 4*c*, the secondary winding is connected to the corresponding capacitor by directly turning on the corresponding half bridge arm in a corresponding phase. For example, in FIG. 4*b*, the switching transistors S5 and S6 and the switching transistors S5' and S6' are directly turned on while other switching transistors are turned off, or the switching transistors S7 and S8 and the switching transistors S7' and S8' are directly turned on while other switching transistors are turned off, allowing the current flowing through the branch where the secondary winding is located to flow to the capacitor C4. In FIG. 4*c*, if the switching transistors S5 and S6 and the switching transistors S7' and S8' are directly turned on, and other switching transistors are turned off, the current flowing through the branch where the secondary winding is located flows to the capacitor C5. If the switching transistors S5 and S6 and the switching transistors S7" and S8" are directly turned on, and other switching transistors are turned off, the current flowing through the branch where the secondary winding is located flows to the capacitor C6. If the switching transistors S5' and S6' and the switching transistors S7" and S8" are directly turned on, and other switching transistors are turned off, the current flowing through the branch where the secondary winding is located flows to the capacitor C7. Other situations are similar to the above and are not described in detail herein.

In the above two implementations, the current flowing through the branch where the secondary winding is located is decreased to zero as long as the preset time period is long enough. For example, the preset time period may be set to be greater than or equal to a switching cycle of each switching transistor in the secondary circuit, depending on the application environment. All the implementations fall within the protection scope of the present disclosure.

Figure 11:
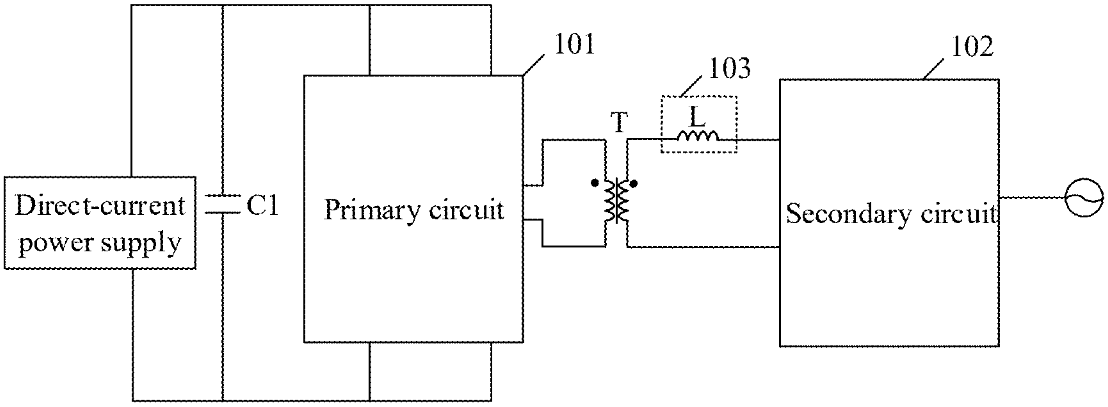
FIG. 11 is a schematic structural diagram of a converter according to an embodiment of the present disclosure.

A converter is further provided according to another embodiment of the present disclosure. As shown in FIG. 11, the converter includes a transformer T, a primary circuit 101, a secondary circuit 102, an inductive device 103 and a controller (not shown in FIG. 11).

A first side of the primary circuit 101 serves as a first side of the converter. A second side of the primary circuit 101 is connected to a first side of the secondary circuit 102 through the inductive device 103 and the transformer T connected in series. A second side of the secondary circuit 102 serves as a second side of the converter.

Figure 12A:
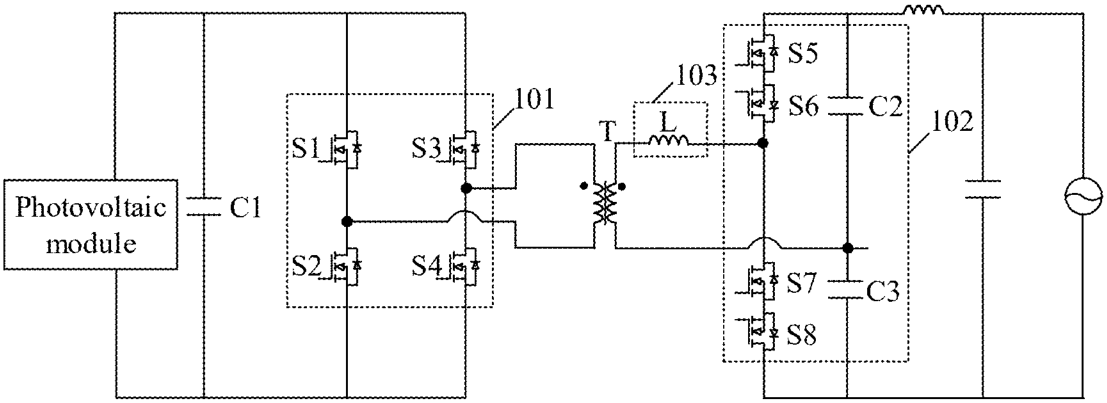
FIG. 12*a* is a circuit diagram of a converter according to an embodiment of the present disclosure.
Figure 12B:
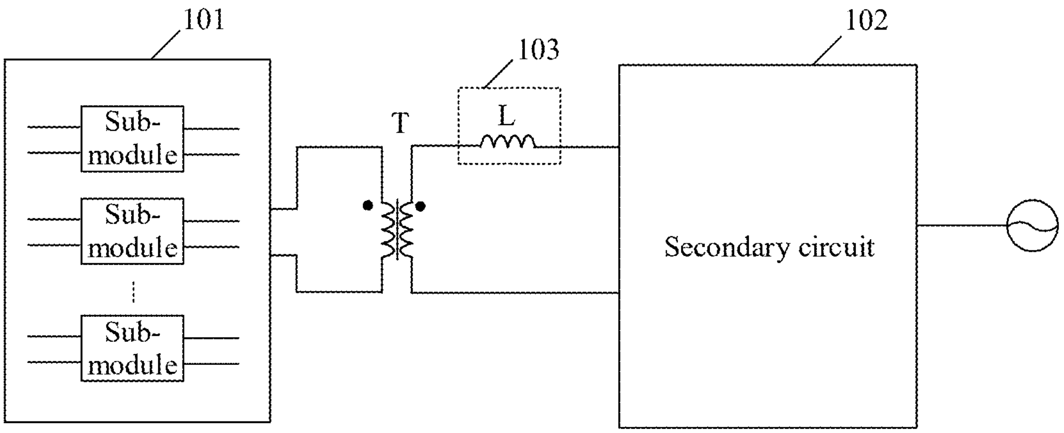
FIG. 12*b* is a schematic structural diagram of a converter according to an embodiment of the present disclosure.

In addition, the primary circuit 101 includes at least one sub-module. As shown in FIG. 12*a*, the primary circuit 101 includes one sub-module. As shown in FIG. 12*b*, a quantity of the sub-module is greater than one, corresponding sides of the respective sub-modules are connected in series or in parallel to form a branch, and the branch is connected to the second side of the primary circuit 101, and the other sides of the respective sub-modules serve as corresponding ports of the first side of the primary circuit 101, respectively.

In practices, the sub-module may be implemented by an H-bridge circuit (including switching transistors S1 to S4 as shown in FIG. 12*a*). In this case, the converter is a single-stage inverter. A first side of the converter is a direct-current side, and is connected to a direct-current capacitor (such as C1 as shown in FIG. 11) and a direct-current power supply. The direct-current power supply may be a photovoltaic module or a battery module in an energy storage system. A second side of the converter is an alternating-current side, and is connected to a single-phase power grid or a three-phase power grid.

The half bridge arm of the secondary circuit 102 includes a bidirectional switch. The bidirectional switch may include two switching transistors connected in reverse series (such as S5 and S6, S7 and S8, S5' and S6', S7' and S8', S5" and S6", and S7" and S8" as shown in FIG. 4*a* to FIG. 4*c*). Each of the switching transistors may be a MOSFET (Metal-Oxide-Semiconductor Field-Effect Transistor), an IGBT (Insulated Gate Bipolar Transistor) with an anti-parallel diode, or the like, depending on the application environment. All the implementations fall within the protection scope of the present disclosure.

As shown in FIG. 4*a*, the secondary circuit 102 may include an alternating-current capacitor bridge arm 203 and two half bridge arms 201 and 202. The two half bridge arms 201 and 202 are connected to each other, and a connection point of the two half bridge arms 201 and 202 is connected to a terminal of the first side of the secondary circuit 102. The alternating-current capacitor bridge arm 203 includes capacitors C2 and C3 connected in series. A midpoint of the alternating-current capacitor bridge arm 203, that is, a connection point of the capacitors C2 and C3, is connected to the other terminal of the first side of the secondary circuit 102. The two half bridge arms 201 and 202 are connected to each other to form a branch, and the branch is connected in parallel with the alternating-current capacitor bridge arm 203 and is connected to the second side of the secondary circuit 102.

As shown in FIG. 4*b*, the secondary circuit 102 may include four half bridge arms. Each two of the four half bridge arms are connected in series to form a bridge arm. Two terminals of the bridge arm are connected to the second side of the secondary circuit 102. A midpoint of the bridge arm is connected to the first side of the secondary circuit 102. The capacitor C4 is arranged between two terminals of the second side of the secondary circuit 102.

As shown in FIG. 4*c*, the secondary circuit 102 may include six half bridge arms. Each two of the six half bridge arms are connected in series to form a bridge arm. Two terminals of the bridge arm are connected to the first side of the secondary circuit 102. A midpoint of the bridge arm is connected to the second side of the secondary circuit 102. Capacitors C5 to C7 are arranged between corresponding two terminals of the secondary circuit 102.

In practices, the inductive device 103 may be arranged between the secondary winding of the transformer T and the secondary circuit 102, as shown in FIG. 11. Alternatively, the inductive device 103 may be arranged between a primary winding of the transformer T and the primary circuit 101 (not shown). The arrangement position of the inductive device depends on the application environment. All the implementations are fall within the protection scope of the present disclosure.

Moreover, the inductive device 103 may only include a resonant inductor (L shown in FIG. 4*a* to FIG. 4*c* and FIG. 11 to FIG. 12*b*), or may include the resonant inductor and a resonant capacitor that are connected in series, which is not limited here, depending on the application environment.

The primary circuit 101 and the secondary circuit 102 are both controlled by the controller. The controller is configured to perform the pulse blocking method for controlling a converter as described in any of the above embodiments. The process and principle of the pulse blocking method may be referred to the above embodiments and are not repeated here.

Referring to FIG. 12*a*, the primary circuit 101 is implemented by an H-bridge circuit and the secondary circuit 102 is implemented in the single-phase structure shown in FIG. 4*a*. The converter may serve as a micro inverter. A high-frequency transformer T in the converter is configured to boost a voltage, and isolate the primary side from the secondary side. In such topology, a single-stage grid connection function can be realized by controlling an external phase-shift angle of the primary side and an external phase-shift angle of the secondary side and an internal phase-shift angle of the bridge arm of the primary circuit 101. Other combinations of structures of the primary circuit 101 and the secondary circuit 102 and the position of the inductive device 103 fall within the protection scope of the present disclosure, and are not described in detail herein.

The same and similar parts among the embodiments may be referred to each other. Each of the embodiments focuses on its differences from the other embodiments. The system or system embodiments are essentially similar to the method embodiments, and therefore are described briefly. Reference may be made to the description of the method embodiments for relevant details of the system or system embodiments. The systems and system embodiments described above are only illustrative. The units described as separate components may or may not be physically separated. Components shown as units may or may not be a physical unit, that is, the components may be located at a same position or distributed over multiple network units. Some or all of the modules may be adopted based on an actual need to achieve the objective of the solutions in the embodiments of the present disclosure. Those skills in the art can understand and implement the method without any creative effort.

Those skilled in the art may further understand that, units and algorithm steps described in conjunction with the embodiments disclosed herein may be realized by electronic hardware, computer software or a combination thereof. In order to clearly describe interchangeability of the hardware and the software, the composition and steps of each embodiment are generally described above based on functions. Whether a function is to be implemented by hardware or software depends on a particular application of the technical solutions and a design constraint. Those skilled in the art may implement the described functions through different methods for each specific application. Such implementation should not be considered going beyond the scope of the present disclosure.

For the above description of the disclosed embodiments, the features recorded in the embodiments in this specification may be replaced or combined with each other so as to enable those skilled in the art to implement or use the present disclosure. Various modifications to the embodiments are apparent to those skilled in the art, and the generic principles defined herein may be practiced in other embodiments without departing from the spirit or scope of the present disclosure. Therefore, the present disclosure is not to be limited to the embodiments shown herein, but is conformed to the widest scope consistent with the principles and novel features disclosed herein.

The invention claimed is:

1. A pulse blocking method for controlling a converter, wherein a half bridge arm of a secondary circuit connected to a transformer in the converter comprises a bidirectional switch, and the transformer is connected in series with an inductive device, wherein the pulse blocking method comprises:

determining whether to turn off switching transistors in the converter;

turning off switching transistors in a primary circuit connected to the transformer, if it is determined to turn off the switching transistors in the converter; and turning off switching transistors in the secondary circuit in a case that current flowing through a branch where a secondary winding of the transformer is located is zero; or, turning off switching transistors in the secondary circuit in batches in a case that current flowing through a branch where a secondary winding of the transformer is located continues to flow and is decreased to zero.

2. The pulse blocking method for controlling a converter according to claim 1, wherein the turning off switching transistors in the secondary circuit in a case that current flowing through a branch where a secondary winding of the transformer is located is zero comprises:

detecting, by a current sensor, a zero-crossing point of the current flowing through the branch where the secondary winding is located; and turning off the switching transistors in the secondary circuit at the zero-crossing point.

3. The pulse blocking method for controlling a converter according to claim 1, wherein the turning off switching transistors in a primary circuit connected to the transformer, and turning off switching transistors in the secondary circuit in batches in a case that current flowing through a branch where a secondary winding of the transformer is located continues to flow and is decreased to zero comprises:

turning off the switching transistors in the primary circuit;

turning off a part of the switching transistors in the secondary circuit, and controlling the other part of the switching transistors in the secondary circuit to operate, to provide a freewheeling loop for the current flowing through the branch where the secondary winding is located, wherein the current flowing through the branch where the secondary winding is located is decreased to zero through the freewheeling loop; and turning off the remaining switching transistors in the secondary circuit.

4. The pulse blocking method for controlling a converter according to claim 3, wherein the turning off a part of the switching transistors in the secondary circuit comprises: turning off a chopper transistor in the secondary circuit, wherein the chopper transistor is a switching transistor that performs a chopping operation in the bidirectional switch under a current condition of an instantaneous value of a grid voltage or a phase angle of the grid voltage; and the controlling the other part of the switching transistors in the secondary circuit to operate comprises: directly turning on a turn-on transistor in the secondary circuit, and going to the process of turning off the remaining switching transistors in the secondary circuit if a preset time period expires, wherein the turn-on transistor is a switching transistor that is directly turned on in the bidirectional switch under the current condition of the instantaneous value of the grid voltage or the phase angle of the grid voltage.

5. The pulse blocking method for controlling a converter according to claim 3, wherein the turning off a part of the switching transistors in the secondary circuit, and controlling the other part of the switching transistors in the secondary circuit to operate comprises:

directly turning on the switching transistor in the half bridge arm that forms a loop with the secondary winding and a capacitor on the other side of the secondary circuit, and turning off the other switching transistors in the secondary circuit; and going to the process of turning off the remaining switching transistors in the secondary circuit if a preset time period expires.

6. The pulse blocking method for controlling a converter according to claim 4, wherein the preset time period is greater than or equal to a switching cycle of each of the switching transistors in the secondary circuit.

7. The pulse blocking method for controlling a converter according to claim 1, wherein the determining whether to turn off switching transistors in the converter off comprises:

determining whether a shutdown command or a pulse blocking command is received; and determining to turn off the switching transistors in the converter on receipt of the shutdown command or the pulse blocking command.

8. A converter, comprising:

a transformer, an inductive device, a primary circuit, a secondary circuit; and a controller; wherein, a first side of the primary circuit serves as a first side of the converter, and a second side of the primary circuit is connected to a first side of the secondary circuit through the inductive device and the transformer connected in series;

a second side of the secondary circuit serves as a second side of the converter, and a half bridge arm of the secondary circuit comprises a bidirectional switch; and the primary circuit and the secondary circuit are controlled by the controller, and the controller is configured to perform the pulse blocking method for controlling a converter according to claim 1.

9. The converter according to claim 8, wherein the primary circuit comprises at least one sub-module, wherein in a case where a quantity of the at least one sub-module is greater than one, corresponding sides of the respective sub-modules are connected in series or in parallel to form a branch, the branch is connected to the second side of the primary circuit, and the other sides of the respective sub-modules serve as corresponding ports of the first side of the primary circuit, respectively.

10. The converter according to claim 9, wherein the at least one sub-module is implemented by an H-bridge circuit.

11. The converter according to claim 8, wherein the secondary circuit comprises an alternating-current capacitor bridge arm and the two half bridge arms, wherein the two half bridge arms are connected to each other, and a connection point of the two half bridge arms is connected to a terminal of the first side of the secondary circuit;

a midpoint of the alternating-current capacitor bridge is connected to the other terminal of the first side of the secondary circuit; and the two half bridge arms are connected to each other to form a branch, and the branch is connected in parallel with the alternating-current capacitor bridge and is connected to the second side of the secondary circuit.

12. The converter according to claim 8, wherein the secondary circuit comprises four half bridge arms, wherein each two of the four half bridge arms are connected in series to form a bridge arm;

two terminals of the bridge arm are connected to the second side of the secondary circuit;

a midpoint of the bridge arm is connected to the first side of the secondary circuit; and a capacitor is arranged between two terminals of the second side of the secondary circuit.

13. The converter according to claim 8, wherein the secondary circuit comprises six half bridge arms, wherein each two of the six half bridge arms are connected in series to form a bridge arm;

two terminals of the bridge arm are connected to the first side of the secondary circuit;

a midpoint of the bridge arm is connected to the second side of the secondary circuit; and a capacitor is arranged between each two terminals of the second side of the secondary circuit.

14. The converter according to claim 8, wherein the inductive device comprises:

a resonant inductor; or a resonant inductor and a resonant capacitor that are connected in series.

* * * * *